United States Patent
Maly et al.

(10) Patent No.: US 6,968,428 B2
(45) Date of Patent: Nov. 22, 2005

(54) MICROPROCESSOR CACHE DESIGN INITIALIZATION

(75) Inventors: John Warren Maly, LaPorte, CO (US); Ryan Clarence Thompson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 10/180,185

(22) Filed: Jun. 26, 2002

(65) Prior Publication Data

US 2004/0003175 A1    Jan. 1, 2004

(51) Int. Cl.[7] .............................................. G06F 12/00
(52) U.S. Cl. ........................ 711/128; 711/144; 711/145
(58) Field of Search ........................ 711/128, 144, 145

(56) References Cited

U.S. PATENT DOCUMENTS

| | | | |
|---|---|---|---|
| 5,564,034 A | 10/1996 | Miyake | 395/455 |
| 5,586,290 A * | 12/1996 | Hirai et al. | 711/113 |
| 5,987,561 A | 11/1999 | Witt et al. | 711/3 |
| 6,006,317 A | 12/1999 | Ramagopal et al. | 712/23 |
| 6,052,697 A | 4/2000 | Bennett et al. | 707/205 |
| 6,052,698 A | 4/2000 | Bennett et al. | 707/205 |
| 6,189,068 B1 | 2/2001 | Witt et al. | 711/3 |
| 2002/0010839 A1 * | 1/2002 | Tirumala et al. | 711/133 |
| 2002/0156970 A1 * | 10/2002 | Stewart | 711/113 |

FOREIGN PATENT DOCUMENTS

| | | | |
|---|---|---|---|
| JP | 2001188766 | 1/2000 | |
| WO | WO 00/68777 | 11/2000 | G06F 15/78 |

OTHER PUBLICATIONS

"Cache Mapping and Associativity," Lay Networks (2002), http://www.laynetworks.com/users/w ebs/cs01_tutorial2.htm.

"The Fundamentals of Cache," Paul Mazzucco, SystemLogic.Net (2002), http://www.systemlogic.net/articles/00/10/cache/index.php.

* cited by examiner

Primary Examiner—Mano Padmanabhan
Assistant Examiner—Midys Rojas

(57) ABSTRACT

Techniques are disclosed for initializing a representation of a cache in a microprocessor design under test. The cache representation includes a plurality of cache entries, each of which is uniquely referenced by an address-way pair. A test case includes a plurality of cache initialization records, each of which includes a cache entry reference and an initial cache entry value. Each cache entry reference includes an address identifier and a way identifier. An initializer reads the cache initialization records and uses the records which contain valid address-way pairs to initialize cache entries in the cache representation. The initializer then uses the remaining records, in which the way identifier is an invalid (e.g., null) value, to initialize cache entries in the cache representation. Valid way identifiers are selected for these records in a manner which ensures that cache entries are not initialized more than once.

16 Claims, 8 Drawing Sheets

MICROPROCESSOR CACHE DESIGN INITIALIZATION

BACKGROUND

1. Field of the Invention

The present invention relates to integrated circuit design and, more particularly, to the initialization of the cache portion of a microprocessor design under test.

2. Related Art

Various electronic design automation (EDA) software tools exist for designing microprocessors and other circuitry. Such tools allow circuit designers to create and modify virtual models of the circuit being designed. A circuit designer may, for example, specify a circuit design using a textual description written in a hardware description language (HDL), such as Verilog or VHDL, or by using a graphical user interface to manipulate a graphical representation of the circuit design.

Software tools are also used frequently for testing circuit designs. Circuit testing tools typically simulate the operation of the circuit design; the portion of the testing tool that performs this simulation is therefore called a "simulator." To test a microprocessor design, for example, the circuit designer typically creates one or more "test cases." A test case typically specifies a set of initial values for machine resources (such as registers, caches, and main memory) and a set of test microprocessor instructions for the simulator to execute. The test case may also include the outputs that are expected to result from performing the test instructions based on the initial values.

A software program called an "initializer" reads the test case and modifies the initial state of the simulated processor design to reflect the initial state values specified by the test case. Once the processor design is initialized, the simulator simulates the execution of the instructions specified by the test case and verifies that the expected output is produced as a result. A significant advantage of using such simulators for testing is that they may detect errors prior to the costly and time-consuming fabrication of the circuit itself.

Increases in microprocessor speed continue to outpace the speed at which main memory (such as DRAM) may be accessed. As a result, caches have become increasingly important in microprocessor designs. A cache is a high-speed memory, such as SRAM, which stores the contents of main memory locations that have been used frequently and/or recently. It is common for cache latency (access time) to be shorter than main memory latency by a factor of fifty or more. Microprocessor load and store operations attempt to use the cache whenever possible to take advantage of its higher bandwidth. Modern microprocessors typically include at least two levels of cache, referred to as Level 1 (L1) and Level 2 (L2) cache. Cache memory is typically more expensive than main memory due to its high bandwidth. One aspect of microprocessor design therefore involves determining how much of each kind of cache to include in the processor design, based on the tradeoff between speed and cost.

Several kinds of cache architectures are commonly used in microprocessor designs. For example, in a "direct-mapped cache," main memory is logically subdivided into equal-sized portions, each of which is mapped to a particular cache line. A cache line (also referred to herein as a "cache entry") is an individual unit of storage in the cache, each of which is typically 256 bits (32 bytes) wide in modern caches. When a read operation requests the value stored in a particular main memory location, the processor maps the memory location's address to the corresponding cache line address and determines whether the cache line contains a valid value for the memory location. If the cache line does not contain a valid value for the memory location, the memory location's value is read from main memory and stored in the cache line for use by subsequent read operations. Store operations map memory addresses to cache lines in the same way.

In a "fully associative cache," there is no fixed mapping between particular cache lines and particular portions of main memory. Rather, in a fully associative cache, any cache line may store the contents of any memory location. Various techniques have been developed for maintaining and accessing the mapping between memory addresses and cache line addresses in fully associative caches.

In an "N-way associative cache," the cache is divided into sets of N cache lines each, where N is a number such as 2, 4, or 8. Each set may, for example, correspond to a portion of main memory sharing the same lower bits. Each of the cache lines within a set is referred to as a "way." Each memory location in main memory typically is mapped to the cache line set associated with the main memory location's lower bits. The contents of a particular memory location may be stored in any of the ways (cache lines) at a particular cache address.

Although portions of main memory are directly mapped to a cache line set (i.e., cache address), an N-way associative cache is associative within each set. Both the direct-mapped cache architecture and the fully associative cache architecture are therefore special cases of the N-way associative cache architecture. For example, a direct-mapped cache is an N-way associative cache in which N is equal to one. Similarly, a fully associative cache is an N-way associative cache in which N is equal to the number of cache lines. One aspect of microprocessor design involves determine which type(s) of cache to use based on various design considerations that are well-known to those of ordinary skill in the art.

As described above, microprocessor designs under test model the resources of a microprocessor, including its cache(s). In an N-way associative cache, each cache line may be uniquely referenced by an address-way pair (A, W), where A is the cache line's address and W is the cache line's way. The cache model in a microprocessor design therefore is typically represented as a two-dimensional data structure. The value stored in the cache model at each index (A, W) represents the value stored in the cache at index (A, W). The cache model therefore represents the state of the cache at a particular point in time.

As described above, circuit design testing tools typically receive as an input a test case which specifies initial conditions for the microprocessor design under test. One portion of the test case typically specifies initial values for the microprocessor cache(s). This "cache portion" of a test case typically includes a list of initialization records, each of which includes: (1) an address A, (2) a way W, and (3) an initial value I to be stored in the cache model at index (A, W). The initializer sequentially reads this list of initialization records and initializes each cache line entry in the microprocessor cache model with the specified initial values.

One or more initialization records in the test case may specify a cache address but not a way. A test case designer may not specify a way in a particular initialization record because, for example, successful execution of the test case requires only that the specified initial value be stored at a particular address but does not require that the specified initial value be stored at a particular way. Cache initialization records which specify an address but not a way present a problem for conventional initializers. Upon encountering an initialization record that specifies a cache address A but not a way, an initializer may, for example, choose a way W using some predetermined method, and store the specified initial value in the cache model at index (A, W). If, however, a subsequent initialization record specifies the same address-way pair (A, W), it will not be possible for the initializer to store the specified initial value in the cache model at index (A, W) because it is already initialized. Failure to store an initial value at the particular address-way pair specified by the test case may cause execution (by the simulator) of the test case to malfunction.

What is needed, therefore, are improved techniques for initializing the cache portion of a microprocessor design under test.

SUMMARY

Techniques are disclosed for initializing a representation of a cache in a microprocessor design under test. The cache representation includes a plurality of cache entries, each of which is uniquely referenced by an address-way pair. A test case includes a plurality of cache initialization records, each of which includes a cache entry reference and an initial cache entry value. Each cache entry reference includes an address identifier and a way identifier. An initializer reads the cache initialization records and uses the records which contain valid address-way pairs to initialize cache entries in the cache representation. The initializer then uses the remaining records, in which the way identifier is an invalid (e.g., null) value, to initialize cache entries in the cache representation. Valid way identifiers are selected for these records in a manner which ensures that cache entries are not initialized more than once.

Other features and advantages of various aspects and embodiments of the present invention will become apparent from the following description and from the claims.

DETAILED DESCRIPTION

Figure 1:
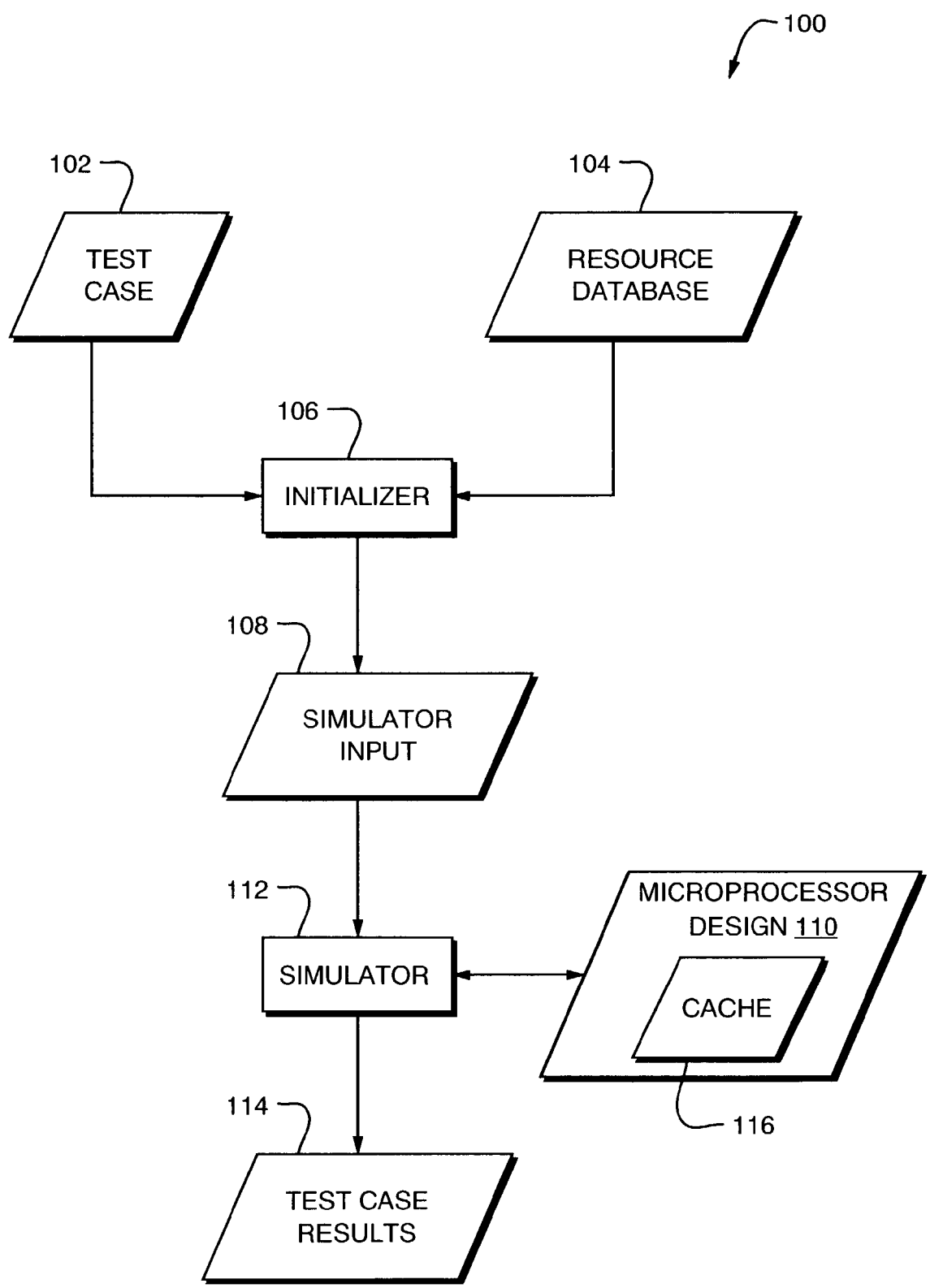
FIG. 1 is a data flow diagram of a system for initializing and testing a simulated microprocessor design according to one embodiment of the present invention.

Referring to FIG. 1, a system 100 is illustrated for initializing and testing a simulated microprocessor design 110 according to one embodiment of the present invention. The microprocessor design 110, also referred to as a hardware model under test or design under test (DUT), is a software (simulated) model of a microprocessor. The microprocessor design 110 models both the operation of the microprocessor (e.g., the functional relationship between inputs and outputs of the microprocessor) and the state of the microprocessor's machine resources, such as its registers, cache(s), and main memory, at a particular point in time. The term "machine resource representation" refers herein to models of particular machine resources contained within the microprocessor design 110.

The microprocessor design 110 may have a multi-core and/or multi-thread microprocessor architecture, in which case the microprocessor design 110 models the state of each core and/or thread in the architecture. The microprocessor design 110 may be implemented, for example, in a data structure in the memory of a computer or in a file stored on a hard disk or other computer-readable medium.

The system 100 also includes a resource database 104, which defines properties of each of the microprocessor design's machine resources, and which may also provide default values for each such resource. In particular, the resource database 104 may define the number of caches in the microprocessor design 110, and the number of addresses and ways in each of the caches.

The system 100 includes a test case 102, which includes test vectors that specify both initial values for the (simulated) machine resources of the microprocessor design 110 and test instructions to be executed (in simulation) by the microprocessor design 110. The test case 102 may, for example, be implemented in a file stored on a computer-readable medium or as a data structure in the memory of a computer. Examples of initial machine resource values provided by the test case 102 are described in more detail below with respect to FIG. 3.

The system 100 also includes an initializer 106 and a simulator 112, both of which may be implemented as software programs written in any appropriate programming language, such as the C programming language. The initializer 106 initializes the state of the microprocessor design 110 based on the initial machine resource values provided in the test case 102 and the machine resource definitions provided in the resource database 104. In one embodiment, for example, the initializer 106 receives the test case 102 and the resource database 104 as inputs and produces simulator input 108 as an output. The simulator input 108 specifies the initial values of the microprocessor's machine resources, the test instructions to be executed, and the expected output produced by executing such instructions, in a format suitable for input to the simulator 112.

The simulator 112, in conjunction with the microprocessor design 110, provides an independent architectural reference model of the microprocessor. The simulator 112 receives the simulator input 108 and initializes the (simulated) machine resources of the microprocessor design 110 with the initial values specified in the simulator input 108. Alternatively, the initializer 106 may directly initialize the microprocessor design 110 with the initial machine resource values specified by the test case 102.

Once the microprocessor design 110 has been initialized (whether by the initializer 106 or the simulator 112), the simulator 112 simulates execution of the instructions specified in the simulator input 108 on the microprocessor design 110. The simulator 112 modifies the state of the microprocessor design 110 accordingly as the simulation progresses. The simulator 112 produces test case results 114 which indicate, for example, whether the output produced by executing the test instructions matches the expected output specified by the simulator input 108.

Figure 2A:
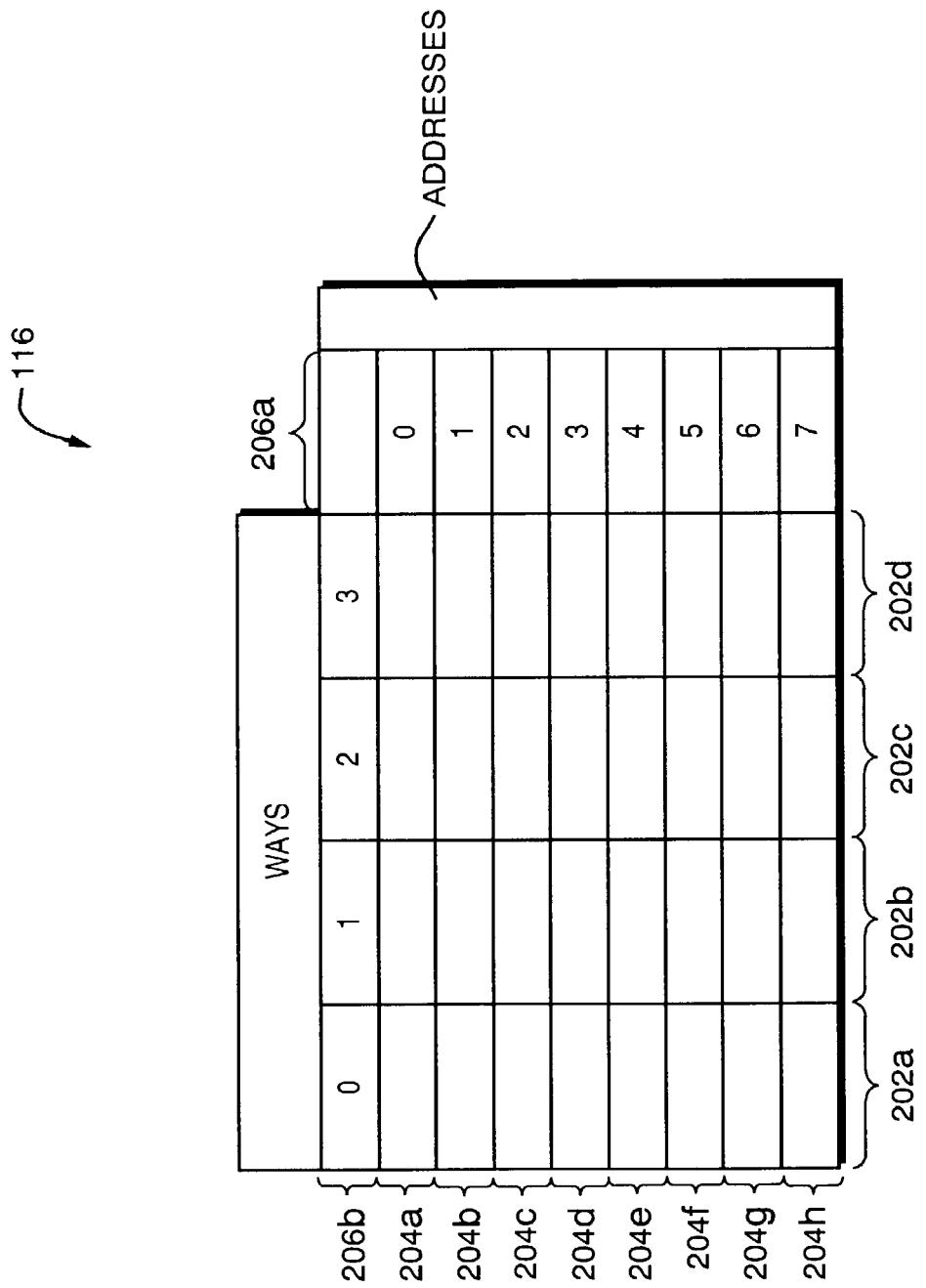
FIG. 2A is a diagram of an un-initialized cache representation according to one embodiment of the present invention.

Operation of the system 100 will now be described in more detail with respect to particular embodiments of the various elements of the system 100. For example, the microprocessor design 110 includes a cache representation 116. The cache representation 116, which may be implemented as a data structure defined in a programming language such as C, represents the structure and state of the microprocessor cache(s). Referring to FIG. 2A, for example, one embodiment of the cache representation 116 is illustrated. Although the cache representation 116 illustrated in FIG. 2A represents a single cache, the microprocessor design 110 may include any number of cache representations representing caches having any combination of properties.

The cache representation 116 represents a 4-way set associative cache (i.e., an N-way set associative cache in which N is equal to 4) for purposes of example. Cache representation 116 is illustrated in the form of a table having columns 202*a–d* and rows 204*a–h*. In particular, each of the rows 204*a–h* corresponds to a particular cache address. Column 206*a* indicates the numerical indices, numbered sequentially beginning with zero, of the cache addresses 204*a–h*. Although only eight cache addresses 206*a* are shown in FIG. 2A for ease of illustration, a cache typically includes thousands of addresses. Each of the columns 202*a–d* corresponds to a particular cache way. Cache ways 202*a–d* are numbered using numerical indices 206*b*, which are numbered sequentially from zero through three. A particular address-way index pair uniquely references a particular entry in the cache representation 116. For example, address-way index pair (3, 1) uniquely references the entry at row 204*d* and column 202*b* in the cache representation 116.

It should be appreciated that there are a total of 32 entries (lines) in the cache representation 116, and that the address indices 206*a* and way indices 206*b* illustrated in FIG. 2 are used as indices into the cache representation 116 but do not constitute part of the contents (i.e., cache data) of the cache representation 116. Address indices 206*a* are referred to more generally herein as "address identifiers" and way indices 206*b* are referred to more generally herein as "way identifiers."

FIG. 2A represents the state of the cache representation 116 before it has been initialized by the initializer 106. All of the entries in the cache representation 116 are illustrated as empty in FIG. 2A to indicate that they are un-initialized. Un-initialized entry values may be implemented, for example, using a NULL value or by associating a flag with each entry which indicates whether the entry has been initialized.

Figure 3:
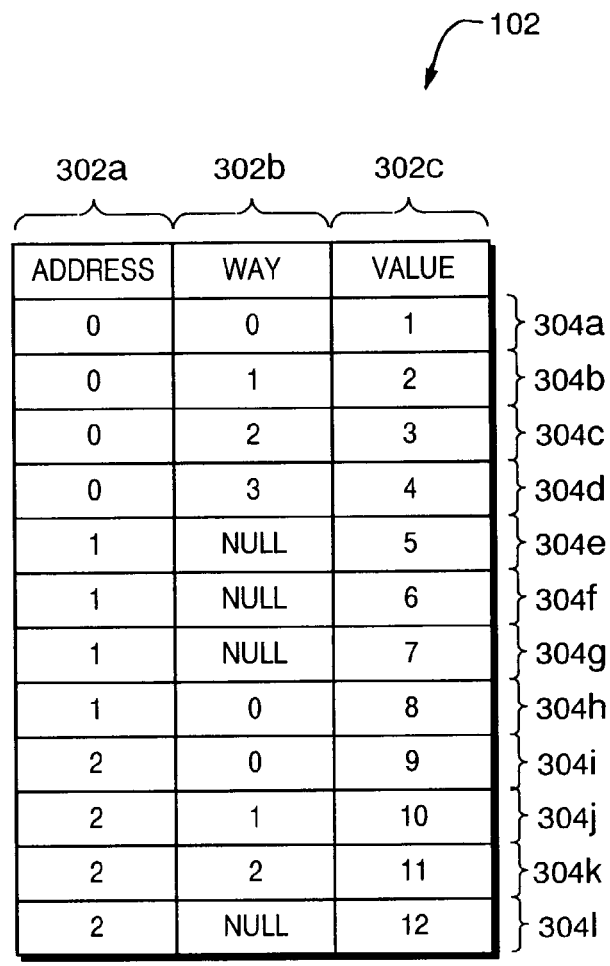
FIG. 3 is a diagram of a cache portion of a test case according to one embodiment of the present invention.

Referring now to FIG. 3, one embodiment of the test case 102 is illustrated. The test case 102 is illustrated in the form of a table having columns 302*a–c* (alternatively referred to as fields) and rows 304*a–l*. In practice, the test case 102 may be implemented in any of a variety of forms, such as a text file, a table generated by word processing or spread-sheet software, a header file or other source code file written in a programming language such as C, or a database file.

For purposes of example, the table illustrated in FIG. 3 provides initial values to be used by the initializer 106 to initialize some of the entries in the cache representation 116. In practice, the test case 102 will typically include initial values for all of the machine resources in the microprocessor design 110 (such as the registers and main memory), as well as test instructions to be executed by the simulator 112. Only a selection of initial cache values are illustrated in FIG. 3 for ease of illustration and explanation. Furthermore, the particular values illustrated in FIG. 3 are chosen for illustrative purposes only.

Each of the rows 304*a–l* specifies an initial value for a particular cache entry. The rows 304*a–l* are therefore also referred to herein as "cache initialization records." Each of the cache initialization records 304*a–l* includes: (1) an address field 302*a*, the value of which indicates the address A of the corresponding cache entry; (2) a way field 302*b*, the value of which indicates the way W of the corresponding cache entry; and (3) an initial value field 302*c*, the value of which specifies an value to be used by the initializer 106 to initialize the cache entry at index (A, W) in the cache representation 116.

The combination of an address A and a way W is referred to herein as a "cache entry reference." A cache initialization record therefore includes both a cache entry reference and an initial cache entry value.

The test case 102 will now be described in more detail with respect to representative examples of the cache initialization records 304*a–l*. Consider, for example, initialization record 304*a*, which refers to a cache entry having address zero (column 302*a*) and way zero (column 302*b*). Initialization record 304*a* indicates that the cache entry at index (0, 0) should be initialized with a value of one (column 302*c*). Similarly, initialization record 304*b* indicates that the cache entry at index (0, 1) should be initialized with a value of two. Initialization records 304*c* and 304*d* specify initial values of three and four for the cache entries at indices (0, 2) and (0, 3), respectively.

Now consider initialization record 304*e*, which specifies an address of one and a way of NULL. The value NULL may be represented by any value, such as −1, which is undefined or out of range (i.e., greater than or equal to the number of ways N). Initialization record 304*e* specifies an initial value of five. Therefore, although initialization record 304*e* refers to a particular cache address, and specifies an initial value to be stored at that cache address, it does not indicate the particular way within the cache address at which the initial value should be stored. The same is true of initialization records 304*f*, 304*g*, and 304*l*. Such records are said herein to "under-specify" cache entries or to be "under-specified." In contrast, records which include valid addresses and ways are referred to herein as "precisely specified."

Figure 4A:
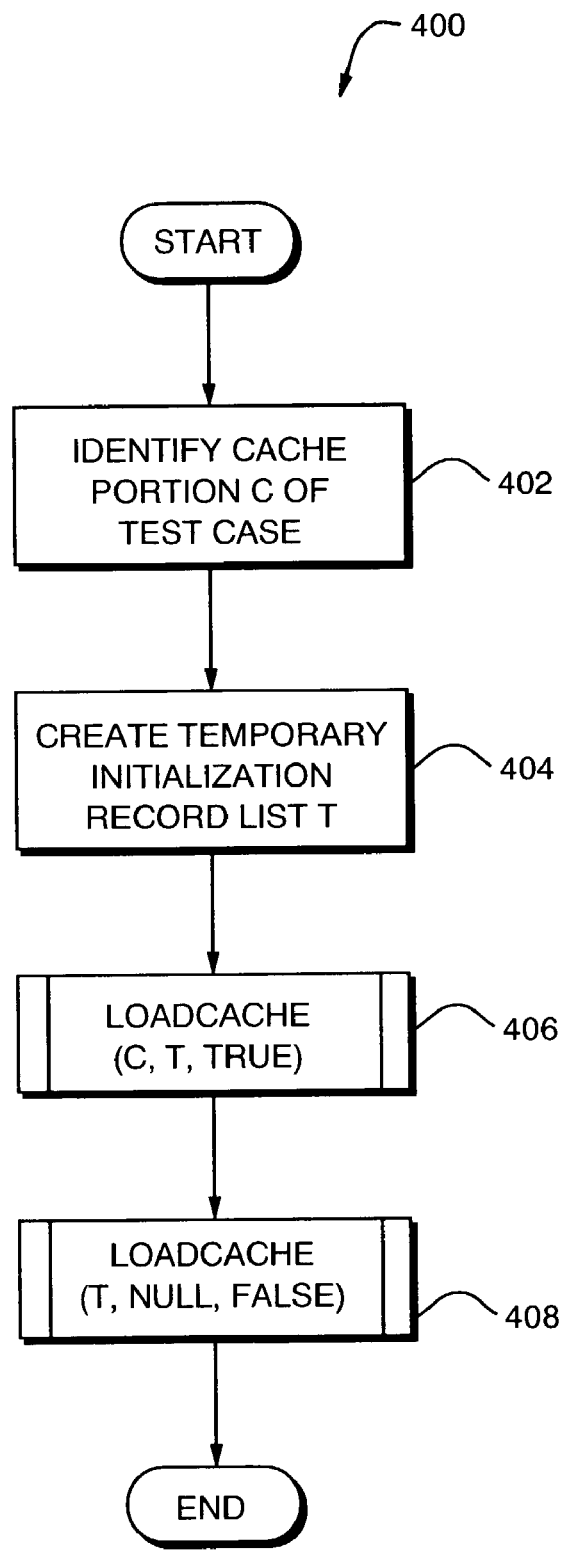
FIG. 4A is a flow chart of a method performed by an initializer to initialize a representation of a cache in a microprocessor design according to one embodiment of the present invention.

Examples of techniques which may be used to initialize the cache representation 116 when the test case 102 includes under-specified cache references will now be described. Referring to FIG. 4A, a flowchart is shown of a method 400 that is performed by the initializer 106 in one embodiment of the present invention to initialize the cache representation 116 based on the initial cache entry values specified by the test case 102. The purpose of the initializer 106 is to define initial values for all of the machine resources in the microprocessor design 110 prior to execution of the simulator 112. The initializer 106 will therefore perform initializations in addition to those illustrated in FIG. 4A, but which are not described herein because they are not relevant to the present invention.

The method 400 identifies the cache portion C of the test case 102 (step 402). The cache portion C may, for example, be represented as a list of address-way pairs and initial values, such as the list illustrated in FIG. 3. If, for example, the test case 102 is implemented as a text file, the text file may contain a series of lines, each of which corresponds to a single cache initialization record. Alternatively, each line of the text file may, for example, correspond to a single field of a cache initialization record (such as the address field 302a, way field 302b, or value field 302c). The method 400 may, for example, sequentially read the lines of the test case 102 representing the cache portion C, parse the text contained therein, and create a data structure in memory representing the list of initialization records 304a–l (FIG. 3).

The method 400 creates a temporary initialization record list T (step 404). As described in more detail below, the temporary list T is used to temporarily store initialization records which specify a cache address but which do not specify a way (i.e., under-specified initialization records). The temporary list T may, for example, be implemented as a data structure (such as a list or array) in the memory of a computer. The temporary list T may have the same logical structure as the cache portion C of the test case. In other words, the temporary list T may include zero or more cache initialization records, each of which has an address field, a way field, and an initial value field. Step 404 creates an empty temporary list (i.e., a list with no records).

Referring again to FIG. 4A, the method 400 performs the initializations specified by the cache portion C in two stages. In the first stage, the method 400 calls a subroutine named LoadCache with the parameters C (the cache portion of the test case 102), T (the temporary cache initialization record list), and the value TRUE (step 406). The LoadCache subroutine performs all initializations indicated by any precisely-specified cache initialization records in the cache portion C.

Figure 4B:
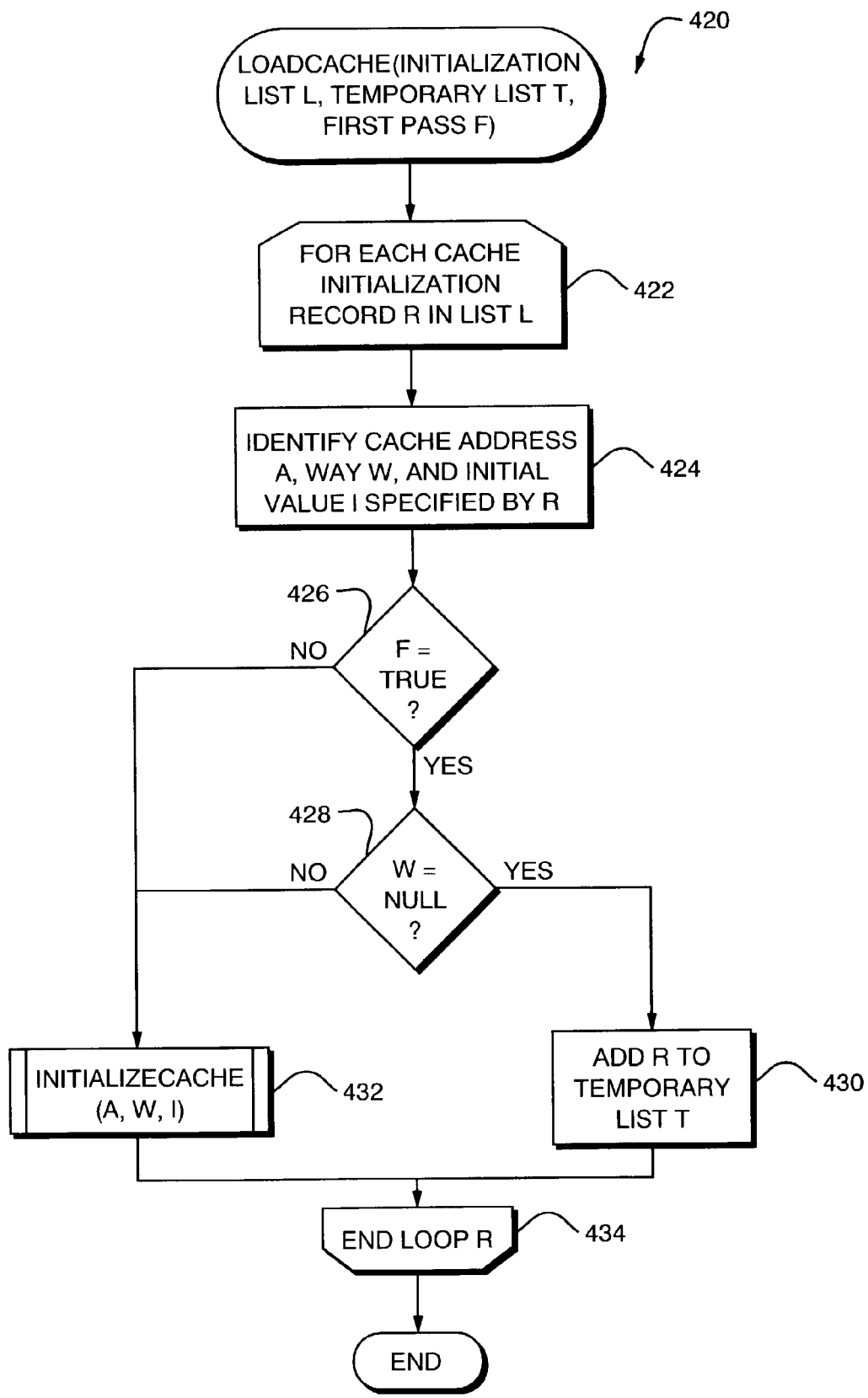
FIG. 4B is a flow chart of a method that is used by the method of FIG. 4A to perform each of the first and second stages of the initialization process of FIG. 4A according to one embodiment of the present invention.

For example, referring to FIG. 4B, a flow chart of the method performed by the LoadCache subroutine 420 is illustrated according to one embodiment of the present invention. The LoadCache subroutine 420 takes three parameters as inputs: (1) an initialization list L which contains cache initialization records to be used to initialize cache entries in the cache representation 116; (2) a temporary list T to temporarily store any under-specified cache initialization records; and (3) a Boolean value F, which specifies whether the LoadCache subroutine 420 is being called during the first or second stage of the initialization method 400. If the value of F is TRUE, then LoadCache 420 is being called during the first stage; if the value of F is FALSE, then LoadCache 420 is being called during the second stage.

The LoadCache subroutine 420 enters a loop over each cache initialization record R in the list L (step 422). For example, during the first initialization stage (initiated by step 406 in FIG. 4A), the initialization list L is the cache portion C of the test case 102. The LoadCache subroutine 420 identifies the cache address A, the way W, and the initial value I specified by the initialization record R (step 424).

If the value of F is TRUE (i.e., if this is the first stage of the initialization method 400) (step 426), the LoadCache subroutine 420 determines whether the value of W is NULL (i.e., whether the initialization record R specifies a way) (step 428). If the value of W is NULL, the LoadCache subroutine 420 adds the initialization record R to the temporary list T (step 430) for use during the second stage of the initialization method 400.

The initialization record R may be added to the temporary list T in any of a variety of ways. For example, the contents of initialization record R may be copied into list T, or a pointer (reference) to initialization record R may be added to list T, thereby obviating the need to copy the contents of initialization record R into list T. Alternatively, the effect of step 430 may be achieved by removing each precisely-specified initialization record from the initialization list L after step 432 (described below), thereby leaving only under-specified initialization records in the initialization list L upon completion of the LoadCache subroutine 420. More generally, the temporary list T may be implemented using any techniques which defer the application of under-specified initialization records until the second stage of the initialization method 400. The temporary list T is therefore also referred to herein as a "deferred initialization list."

If the value of W is not NULL, then the initialization record R precisely specifies a cache entry, and the Load-Cache subroutine 420 calls a subroutine named Initialize-Cache with the parameters A, W, and I (step 432). As described in more detail below with respect to FIG. 4C, the InitializeCache subroutine initializes the cache entry at index (A, W) in the cache representation 116 with the initial value I. The LoadCache subroutine 420 repeats steps 424–432 for the remaining initialization records R in the list L (step 434). Control then returns to the initialization method 400 (FIG. 4A).

Figure 4C:
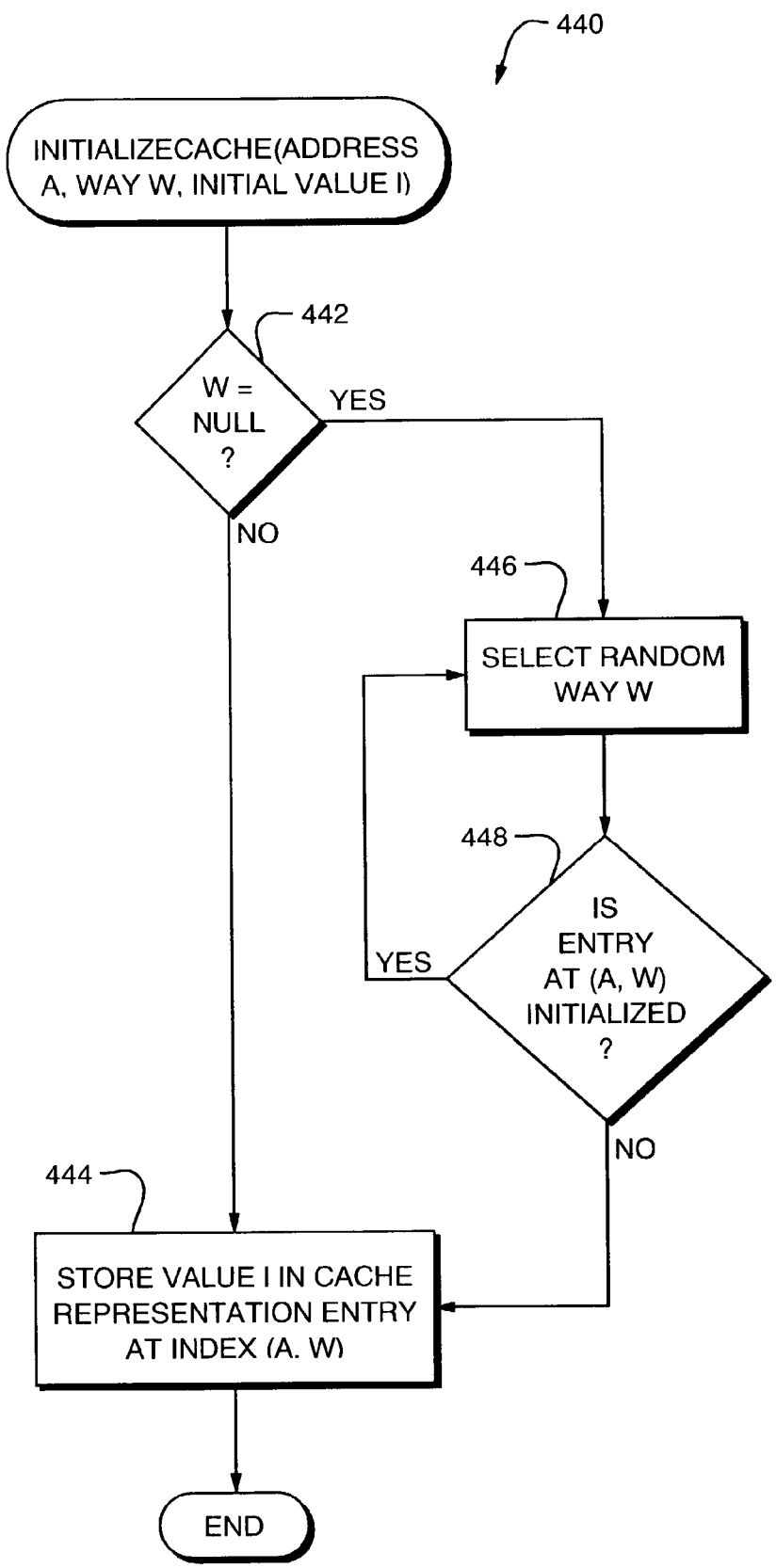
FIG. 4C is a flow chart of a method performed by an initializer to initialize a single cache entry in a cache representation according to one embodiment of the present invention.

Referring to FIG. 4C, a flow chart of the method performed by the InitializeCache subroutine 440 is illustrated according to one embodiment of the present invention. The InitializeCache subroutine 440 determines whether the value of W is NULL (step 442). If the value of W is not NULL (i.e., if a particular value of W is specified), the subroutine 440 stores the initial value I in the cache entry at index (A, W) in the cache representation 116 (step 444).

If the value of W is NULL (i.e., unspecified), the InitializeCache subroutine 440 selects a random way W between zero and N−1, inclusive (step 446). If the cache entry at the index now specified by (A, W) is already initialized (step 448), a new random way W is selected (step 446). Steps 446 and 448 are repeated until index (A, W) identifies an un-initialized entry in the cache representation 116. The InitializeCache subroutine 440 then stores the initial value I in the cache representation entry at index (A, W), thereby initializing it.

The InitializeCache subroutine 440 need not select the way W randomly in step 446. Alternatively, for example, the InitializeCache subroutine 440 may search the address A for the first available (un-initialized) way, and select this un-initialized way as the way W in step 446.

Operation of the LoadCache subroutine 420 during the first stage (i.e., when called by step 406 of initialization method 400) will be explained in more detail with respect to a particular example in which the contents of the cache portion C are as illustrated in FIG. 3. When the LoadCache subroutine 420 is called in this example, it enters a loop over each initialization record R in the cache portion C (step 422). During the first iteration of this loop, the initialization record R is the initialization record 304a (FIG. 3). The LoadCache subroutine 420 identifies the address A (0), the way W (0), and the initial value I (1) specified by the record 304a (step 424). Since F is TRUE in the present example (step 426), the LoadCache subroutine 420 determines whether the value of W is NULL (step 428). Because the value of W is not NULL in this case (i.e., since it is equal to zero), the LoadCache subroutine 420 initializes the cache entry at index (0,0) with the value 1 by calling the InitializeCache subroutine with the parameter values 0, 0, and 1 (step 432).

Figure 2B:
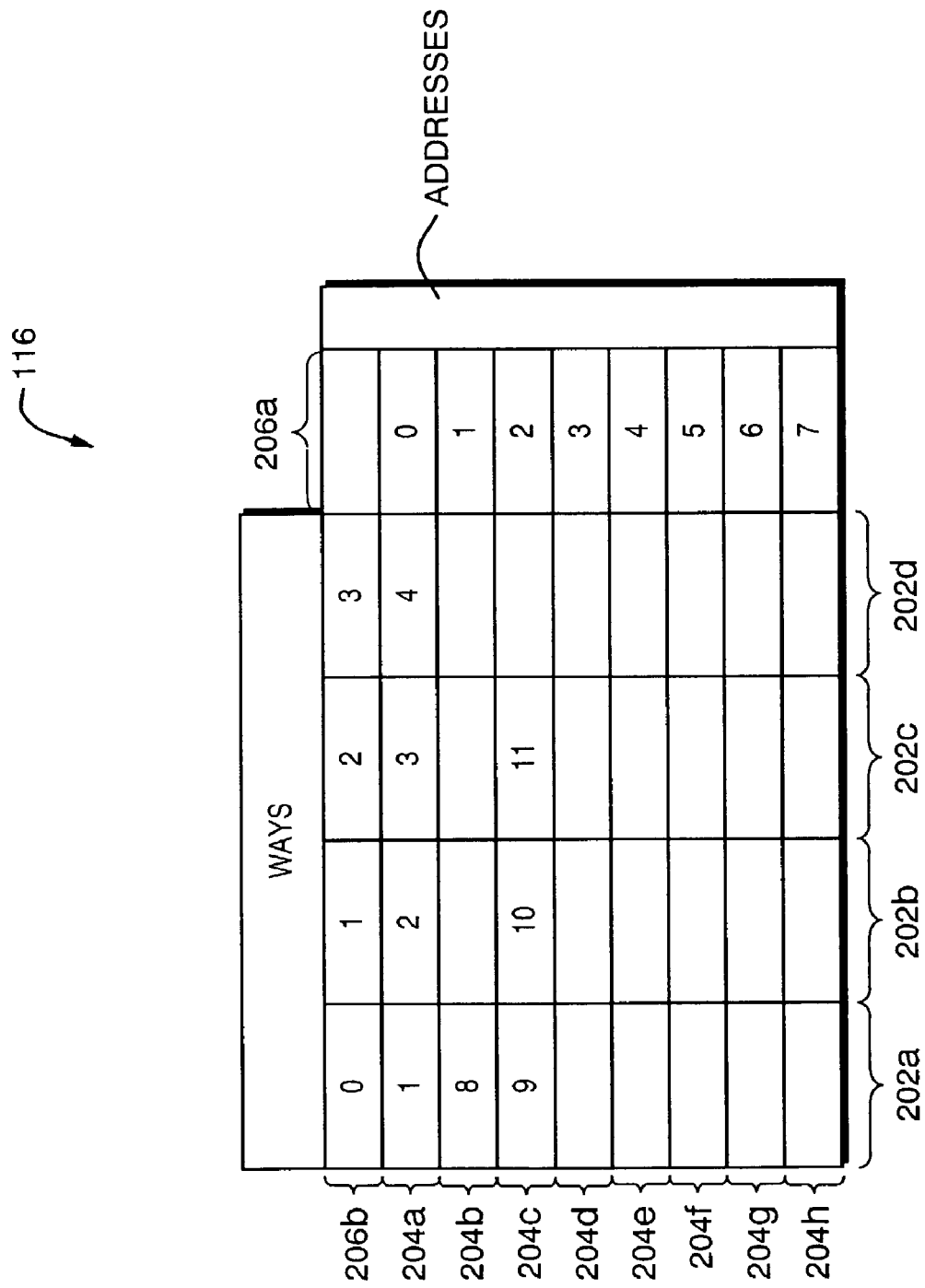
FIG. 2B is a diagram of a cache representation after a first stage of a two-stage initialization process according to one embodiment of the present invention.

Referring to FIG. 2B, for example, the contents of the cache representation 116 upon completion of the first stage of the initialization method 400 (i.e., upon completion of step 406 in FIG. 4A) are illustrated. As shown in FIG. 2B, the initial value "1" is stored at index (0, 0) (row 204a, column 202a).

The LoadCache subroutine 420 operates similarly for initialization records 304b–d in the cache portion C, because all of these records specify both an address and a valid way. The initial values specified by the initialization records 304b–d are reflected in the corresponding cache entries illustrated in row 204a of FIG. 2B.

When the LoadCache subroutine 420 encounters initialization record 304e, however, the address A is one, the way W is NULL, and the initial value I is five. In this case, the LoadCache subroutine 420 determines at step 428 that the value of W is NULL, and therefore adds the initialization record 304e to the temporary list T (step 430).

Figure 5:
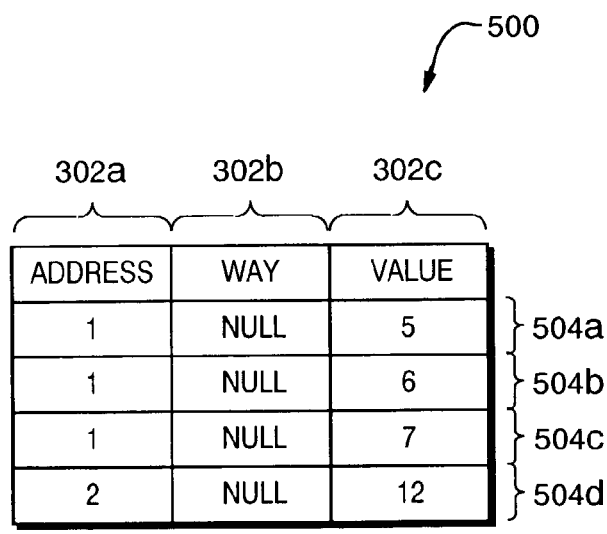
FIG. 5 is a diagram of a temporary list of cache initialization records used by the initialization process of FIG. 4A according to one embodiment of the present invention.

Referring to FIG. 5, for example, example contents of the temporary list T 500 are illustrated upon the completion of the first stage of the initialization method 400. As shown in FIG. 5, the addition of initialization record 304e to the temporary list T (step 430) is reflected by the presence of initialization record 504a in the list 500.

Based on the description above, it may be understood that in the remainder of the first stage, the LoadCache subroutine 420 will add initialization records 304f, 304g, and 304l to the temporary list T (represented in FIG. 5 by records 504b, 504c, and 504d, respectively), and that the LoadCache subroutine 420 will use the values specified by initialization records 304h–304k to initialize corresponding cache entries in the cache representation 116 (as reflected in FIG. 2B). FIG. 2B therefore illustrates the contents of the cache representation 116 upon completion of the first initialization stage (step 406) and FIG. 5 illustrates the contents of the temporary list T upon completion of the first initialization stage.

Returning to FIG. 4A, in a second initialization stage, the method 400 calls the LoadCache subroutine 420 again (step 408). This time, however, the initialization method 400 calls the LoadCache subroutine 420 with the parameters T, NULL, and FALSE. In other words, the initialization method 400 instructs the LoadCache subroutine 420 to initialize the contents of the cache representation 116 using the initialization records contained within the temporary list T (which were not used for initialization during the first stage), and instructs the LoadCache subroutine 420 that this is the second stage of the initialization process.

Operation of the LoadCache subroutine 420 during the second initialization stage (i.e., when called by step 408 of method 400) will be explained in more detail with respect to a particular example in which the contents of the temporary list T are as illustrated in FIG. 5 and in which the contents of the cache representation 116 are as illustrated in FIG. 2B. When the LoadCache subroutine 420 is called in this example, it enters a loop over each initialization record R in the temporary list T (step 422). During the first iteration of this loop, the initialization record R is the initialization record 504a (FIG. 5). The LoadCache subroutine 420 identifies the address A (1), the way W (NULL), and the initial value I (5) specified by the record 504a (step 424). Since F is FALSE in the present example (step 426), the LoadCache subroutine 420 calls the InitializeCache subroutine 440 with the parameters 1, NULL, and 5, respectively (step 432).

Referring again to FIG. 4C, the InitializeCache subroutine 440 determines that the value of W is NULL (step 442), and therefore selects a random way W between zero and N−1, inclusive (step 446). If the cache entry at the index now specified by (A, W) is initialized (step 448), a new random way W is selected (step 446). Steps 446 and 448 are repeated until index (A, W) identifies an un-initialized entry in the cache representation 116. The InitializeCache subroutine 440 then stores the initial value I in the cache representation entry at index (A, W), thereby initializing it.

Assume, for example, that in step 446 the InitializeCache subroutine 440 first selects a random way value W of zero. Because the cache entry at index (1, 0) is already initialized (with a value of 8, as shown in FIG. 2B), another random way W is selected (step 446). Assume for purposes of example that the second random way value that is generated is two. Because the cache entry at index (1, 2) is not initialized (FIG. 2B), the InitializeCache subroutine 440 stores the initial value (5) in the cache entry at index (1, 2).

Figure 2C:
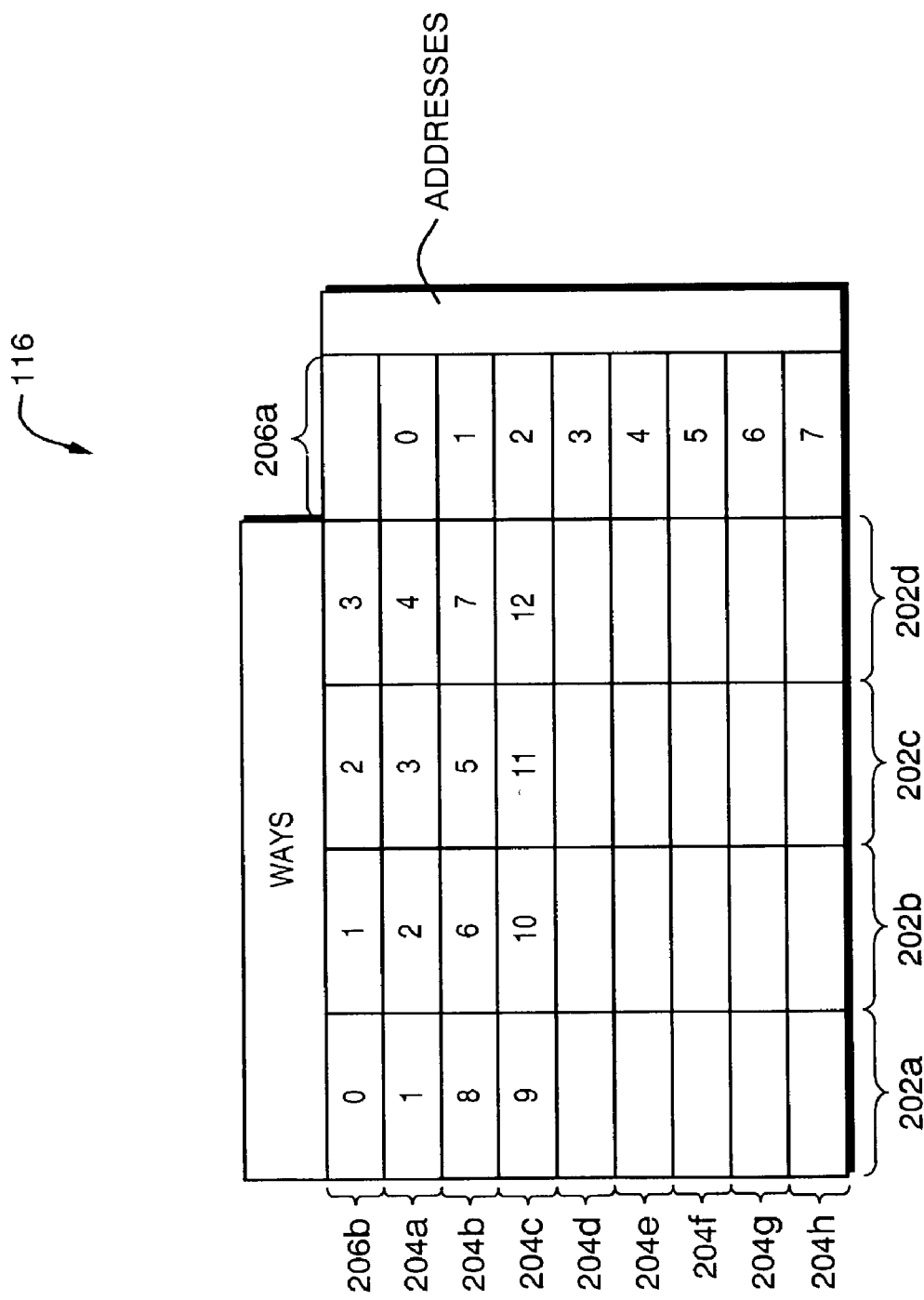
FIG. 2C is a diagram of a cache representation after a second stage of a two-stage initialization process according to one embodiment of the present invention.

Referring to FIG. 2C, for example, the contents of the cache representation 116 upon completion of the second stage of the initialization method 400 (i.e., upon completion of step 408 in FIG. 4A) are illustrated. As shown in FIG. 2C, the initial value "5" is stored in the entry at index (1, 2). The InitializeCache subroutine 440 returns control to the LoadCache subroutine 420 at step 434.

The LoadCache subroutine 420 processes the remaining cache initialization records 504b–d in the temporary list T similarly. Assume for purposes of example that the way values that the InitializeCache subroutine 440 selects for cache initialization records 504b–d are 1, 3, and 3 respectively. In such a case, the initial values (6, 7, and 12, respectively) specified by initialization records 504b–d are reflected in FIG. 2C. Upon completion of step 408, the initialization method 400 is complete.

In one embodiment, the resource database 104 is implemented as a source code file in the C programming language. In this embodiment, the resource database 104 includes a call to a cache representation creation function which creates the cache representation 116 and adds it to the microprocessor design 110. If the microprocessor design 110 includes multiple cache representations, the resource database 104 may include one function call for each cache representation. The cache representation creation function may include as parameters the number of addresses and number of ways in the cache representation to be created. The result of calling the cache creation function may, for example, be to create an un-initialized (i.e., empty) cache representation, such as the cache representation 116 illustrated in FIG. 2A. The cache representation 116 may be implemented as a two-dimensional array or other data structure in the C programming language for performing the same function. For example, the cache representation 116 may be implemented as a linked list using techniques that are well-known to those of ordinary skill in the art.

The initializer 106 and the simulator 112 may be implemented as software programs written in the C programming language or any other programming language. The method 400, the LoadCache subroutine 420, and the InitializeCache subroutine 440 may be implemented as functions in the C programming language or any other programming language. The microprocessor design 110 may be implemented as a data structure stored in the memory of a computer or on a storage medium such as a hard disk.

Among the advantages of the invention are one or more of the following.

One advantage of the techniques disclosed herein is that by first processing all precisely-specified cache initialization records, the initializer 106 ensures that the initial values specified by such records are stored in precisely the cache entries to which they refer. As described above, some conventional sequential initializers randomly select ways for under-specified initialization records, thereby potentially making particular cache entries unavailable for initialization by subsequent precisely-specified initialization records. The result is that the test case may fail to execute properly. In contrast, the techniques disclosed herein process under-specified initialization records after processing all precisely-specified initialization records, thereby guaranteeing that an under-specified initialization record will not be used to initialize a cache entry that is referred to by a precisely-specified initialization record elsewhere in the test case 102.

Another advantage of the techniques disclosed herein is that they may be integrated with an initializer that parses test cases sequentially (i.e., in a single pass), thereby retaining the benefits of sequential parsing while properly processing under-specified cache initialization records. The problem that under-specified initialization records pose for sequential-parsing initializers is that, upon encountering such a record, it is not possible to select a way (whether randomly or through some other method) in which to store the initial value specified by the record while guaranteeing that a subsequent precisely-specified initialization record in the test case 102 will not specify the same address and way.

Although this problem may be solved using a multi-pass or otherwise non-sequential parser, it is desirable to parse test cases sequentially for a variety of reasons. For example, a sequential parse involves reading the test case 102 from disk only once, thereby minimizing disk access and increasing parsing speed. Furthermore, the number of computations required to perform a sequential parse is proportional to the number of initialization records in the test case 102. The techniques described herein may be implemented to retain these advantages. For example, the initializer 106 may sequentially read the cache portion of the test case 102 from disk only once (FIG. 4A, step 402). The temporary list T may be created as a data structure in memory, which may be accessed without requiring disk reads and/or writes. Furthermore, if the number of under-specified initialization records in the test case 102 is small, the additional number of operations performed by subroutines 420 (FIG. 4B) and 440 (FIG. 4C) to store and read information to and from the temporary list T will be relatively small. As a result, the total number of operations perform by the initialization method 400 may be comparable to the total number of operations performed by conventional sequential parsing methods.

It is to be understood that although the invention has been described herein in terms of particular embodiments, the foregoing embodiments are provided as illustrative only, and do not limit or define the scope of the invention. Various other embodiments, including but not limited to the following, are also within the scope of the claims.

The description herein refers to the use of a NULL value, for example, with respect to the value of the way W in the cache initialization records 304a–l (FIG. 3), the cache initialization records 504a–d (FIG. 5), and the subroutines 420 (FIG. 4B) and 440 (FIG. 4C). The NULL value may be implemented in any of a variety of ways. For example, the NULL value may be represented by a value, such as –1, which does not represent a valid way value. Such a value may not be valid, for example, because it is out of range (i.e., it is less than zero or greater than N–1) or because it is an undefined value. Alternatively, some computer programming environments define non-numeric values (such as values indicating an arithmetic overflow) which may be used as the NULL value. The NULL value may also be represented by the absence of a value. For example, if the test case 102 is represented as a text file in which each line corresponds to a cache initialization record field, the NULL value may be represented by the absence of a line representing the way field of a particular cache initialization record.

The LoadCache subroutine 420 (FIG. 4C) may determine whether the way W is equal to NULL (FIG. 4B, step 428), and the InitializeCache subroutine 440 (FIG. 4C) may determine whether the way W is equal to NULL (FIG. 4C, step 442) using any of a variety of techniques. For example, if elements of the system 100 are implemented using the C programming language, a common C header file may be provided which defines the NULL value for use in the test case 102, the LoadCache subroutine 420, and the InitializeCache subroutine 440.

Note that the NULL value that is passed as a parameter to the LoadCache subroutine 420 in step 408 of method 400 (FIG. 4A) may not be the same as the NULL value that is used to indicate an unspecified way. The NULL value passed in step 408 may, for example, be the value zero or a void pointer defined according to the C programming language.

Elements and components described herein may be further divided into additional components or joined together to form fewer components for performing the same functions.

Although the examples described herein are described in relation to the microprocessor design 110, it should be appreciated that the techniques described herein may be applied more broadly to other kinds of circuit design.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. In a system including a representation of a cache in a microprocessor design, a computer-implemented method for initializing the cache representation, the method comprising steps of:
    (A) identifying a first cache initialization record comprising a first cache entry reference and a first initial cache entry value, the first cache entry reference comprising a first address identifier and a first way identifier;
    (B) determining whether the first way identifier specifies any way in the cache; and
    (C) if the first way identifier is determined to specify a first way in the cache, performing steps of:
        (1) identifying a cache entry, in the cache representation, specified by the first address identifier and the first way identifier; and
        (2) initializing the cache entry identified in step (C) (1) with the first initial cache entry value.

2. The method of claim 1, further comprising a step of:
    (D) storing the first cache initialization record in a deferred initialization list if the first way identifier is determined not to specify any way in the cache.

3. The method of claim 1, further comprising a step of:
    (D) performing the steps (A), (B), and (C) for each of a plurality of cache initialization records.

4. The method of claim 3, further comprising a step of:
    (E) storing the first cache initialization record in a deferred initialization list if the first way identifier is determined not to specify any way in the cache; and
    wherein the step (D) comprises a step of performing the steps (A), (B), (C), and (E) for each of the plurality of cache initialization records.

5. The method of claim 4, further comprising a step of:
    (F) for each of a plurality of cache initialization records in the deferred initialization list, performing steps of:
        (1) identifying a second cache initialization record comprising a second cache entry reference and a second initial cache entry value, the second cache entry reference comprising a second address identifier and a second way identifier;
        (2) determining whether the second way identifier specifies any way in the cache;
        (3) if the second way identifier is determined to specify a second way in the cache, performing steps of:
            (i) identifying a cache entry, in the cache representation, specified by the second address identifier and the second way identifier; and
            (ii) initializing the cache entry identified in step (F) (3) (i) with the second initial cache entry value; and
        (4) if it is determined that the second way identifier does not specify any way in the cache, performing steps of:
            (i) selecting a third way identifier such that the second address identifier and the third way identifier specify an un-initialized cache entry in the cache representation; and
            (ii) initializing the un-initialized cache entry with the second initial cache entry value.

6. The method of claim 5, wherein the step (F) (4) (i) comprises steps of:
    (a) randomly selecting the third way identifier;
    (b) determining whether the second address identifier and the third way identifier specify an initialized cache entry in the cache representation; and
    (c) repeating steps (F) (4) (i) (a) and (F) (4) (i) (b) when it is determined that the second address identifier and the third way identifier specify an initialized cache entry in the cache representation.

7. The method of claim 3, wherein the system further comprises a test case file including the plurality of cache initialization records, and wherein the step (D) comprises a step of sequentially reading the plurality of cache initialization records from the test case file.

8. The method of claim 1, wherein the step (B) comprises a step of determining whether the first way identifier comprises a null value.

9. A system comprising:
    a representation of a cache in a microprocessor design;
    identifying means for identifying a first cache initialization record comprising a first cache entry reference and a first initial cache entry value, the first cache entry reference comprising a first address identifier and a first way identifier;
    first determining means for determining whether the first way identifier specifies any way in the cache; and
    initialization means for performing the following steps if the first way identifier is determined to specify a first way in the cache: (1) identifying a first cache entry, in the cache representation, specified by the first address identifier and the first way identifier; and (2) initializing the first cache entry with the first initial cache entry value.

10. The system of claim 9, further comprising:
    means for storing the first cache initialization record in a deferred initialization list if the first way identifier is determined not to specify any way in the cache.

11. The system of claim 9, further comprising:
    iteration means for applying the identifying means, the first determining means, and the initialization means to each of a plurality of cache initialization records.

12. The system of claim 11, further comprising:
    storage means for storing the first cache initialization record in a deferred initialization list if the first way identifier is determined not to specify any way in the cache; and
    wherein the iteration comprises means for applying the identifying means, the first determining means, the initialization means, and the storage means to each of the plurality of cache initialization records.

13. The system of claim 12, further comprising, for each of a plurality of cache initialization records in the deferred initialization list:
    means for identifying a second cache initialization record comprising a second cache entry reference and a second initial cache entry value, the second cache entry reference comprising a second address identifier and a second way identifier;

means for determining whether the second way identifier specifies any way in the cache;

means for performing the following steps if the second way identifier is determined to specify a second way in the cache: (1) identifying a second cache entry, in the cache representation, specified by the second address identifier and the second way identifier; and (2) initializing the second cache entry with the second initial cache entry value; and means for performing the following steps if it is determined that the second way does not specify any way in the cache: (1) selecting a third way identifier such that the second address identifier and the third way identifier specify an un-initialized cache entry in the cache representation; and (2) initializing the un-initialized cache entry with the second initial cache entry value.

14. The system of claim 13, wherein the means for selecting the third way identifier comprises:

random selection means for randomly selecting the third way identifier;

second determining means for determining whether the second address identifier and the third way identifier specify an initialized cache entry in the cache representation; and means for applying the random selection means and the second determining means again when it is determined that the second address identifier and the third way identifier specify an initialized cache entry in the cache representation.

15. The system of claim 11, wherein the system further comprises a test case file including the plurality of cache initialization records, and wherein the iteration means comprises means for sequentially reading the plurality of cache initialization records from the test case file.

16. The system of claim 9, wherein the first determining means comprises means for determining whether the first way identifier comprises a null value.

* * * * *